US011631246B2

(12) United States Patent
Laveau et al.

(10) Patent No.: US 11,631,246 B2
(45) Date of Patent: Apr. 18, 2023

(54) METHOD FOR OUTPUTTING A SIGNAL FROM AN EVENT-BASED SENSOR, AND EVENT-BASED SENSOR USING SUCH METHOD

(71) Applicant: PROPHESEE, Paris (FR)

(72) Inventors: Stephane Laveau, Paris (FR); Xavier Lagorce, Saint-Maur-des-Fosses (FR)

(73) Assignee: PROPHESEE, Paris (FR)

( * ) Notice: Subject to any disclaimer, the term of this patent is extended or adjusted under 35 U.S.C. 154(b) by 68 days.

(21) Appl. No.: 16/957,874

(22) PCT Filed: Dec. 26, 2018

(86) PCT No.: PCT/EP2018/086885
§ 371 (c)(1),
(2) Date: Jun. 25, 2020

(87) PCT Pub. No.: WO2019/129790
PCT Pub. Date: Jul. 4, 2019

(65) Prior Publication Data
US 2020/0372254 A1    Nov. 26, 2020

(30) Foreign Application Priority Data
Dec. 26, 2017   (EP) ..................... 17210575

(51) Int. Cl.
*G06V 20/30*        (2022.01)
*G06V 20/13*        (2022.01)
(Continued)

(52) U.S. Cl.
CPC ............ *G06V 20/30* (2022.01); *G06T 7/0002* (2013.01); *G06T 7/97* (2017.01); *G06V 20/13* (2022.01); *G06V 20/20* (2022.01)

(58) Field of Classification Search
CPC ........ G06V 20/30; G06V 20/13; G06V 20/20; G06T 7/0002; G06T 7/97; H04N 5/3456; H04N 5/369
See application file for complete search history.

(56) References Cited

U.S. PATENT DOCUMENTS 9,489,735 B1 *   11/2016   Reitmayr ................. G06T 7/80
11,057,641 B1 *   7/2021   Hota ..................... H04N 19/176
(Continued)

FOREIGN PATENT DOCUMENTS

EP   2 975 558 A2   1/2016
JP   2017-521746 A   8/2017
(Continued)

OTHER PUBLICATIONS

Delbruck et al., "Activity-Driven, Event-Based Vision Sensors," Proceedings of 2010 IEEE International Symposium on Circuits and Systems (ISCAS), 2010, pp. 2426-2429.
(Continued)

*Primary Examiner* — Ming Y Hon
(74) *Attorney, Agent, or Firm* — Faegre Drinker Biddle & Reath LLP

(57) ABSTRACT

An event-based sensor having a sensing part that produces events asynchronously. The output signal includes information relating to at least some of the produced events. The method comprises: estimating a rate of production of events by the sensing part; while the estimated rate is less than a threshold, transmitting the signal having a variable rate; and when the estimated rate is above the threshold, transmitting the signal including information relating to only some of the produced events, such that a rate of events for which information is included in the signal remains within the threshold.

14 Claims, 2 Drawing Sheets

(51) Int. Cl.
*G06V 20/20* (2022.01)
*G06T 7/00* (2017.01)

(56) References Cited

U.S. PATENT DOCUMENTS

| | | |
|---|---|---|
| 2008/0135731 A1 | 6/2008 | Lichtsteiner et al. |
| 2014/0085447 A1* | 3/2014 | Lorach ................ A61N 1/0543 348/62 |
| 2016/0011654 A1* | 1/2016 | Lee ........................ G06N 3/063 345/156 |
| 2016/0080670 A1* | 3/2016 | Rangan ................... G06K 9/00 348/302 |
| 2016/0210513 A1* | 7/2016 | Wang ...................... G06K 9/629 |
| 2016/0274643 A1* | 9/2016 | Liu .......................... G06F 3/017 |
| 2017/0053407 A1 | 2/2017 | Benosman et al. |
| 2017/0244991 A1* | 8/2017 | Aggarwal .............. G06V 40/23 |
| 2018/0173934 A1* | 6/2018 | Zink ...................... G06V 40/28 |
| 2018/0302562 A1* | 10/2018 | Newcombe ........ H04N 5/23245 |
| 2020/0034524 A1* | 1/2020 | Han ........................ G06F 21/32 |
| 2020/0128245 A1* | 4/2020 | Huang ................... H04N 19/60 |
| 2020/0372254 A1* | 11/2020 | Laveau ................. G06V 20/13 |

FOREIGN PATENT DOCUMENTS

| | | |
|---|---|---|
| JP | 2017-530467 A | 10/2017 |
| WO | 2016/043918 A1 | 3/2016 |

OTHER PUBLICATIONS

Lichtsteiner et al., "A 128×128 120 dB 15 μs Latency Asynchronous Temporal Contrast Vision Sensor," IEEE Journal of Solid-State Circuits, Feb. 2008, vol. 43, No. 2, pp. 566-576.
Posch et al., "A QVGA 143 dB Dynamic Range Frame-Free PWM Image Sensor With Lossless Pixel-Level Video Compression and Time-Domain CDS," IEEE Journal of Solid-State Circuits, Jan. 2011, vol. 46, No. 1, pp. 259-275.
Office Action issued in related application JP 2020-535562, dated Dec. 23, 2022, with English language translation, 8 pages.

* cited by examiner

METHOD FOR OUTPUTTING A SIGNAL FROM AN EVENT-BASED SENSOR, AND EVENT-BASED SENSOR USING SUCH METHOD

CROSS-REFERENCE TO RELATED APPLICATIONS

This application is the U.S. national phase of the International Patent Application No. PCT/EP2018/086885, filed Dec. 26, 2018, which claims the benefit of European Patent Application No. 17210575.1, filed Dec. 26, 2017, the entire content of which is incorporated herein by reference.

FIELD

The present disclosure relates to the handling of signals generated by asynchronous, event-based sensors.

BACKGROUND

Contrary to conventional cameras that record successive images at regular sampling instants, biological retinas do not transmit redundant information on the scene to be visualized, and in an asynchronous manner. Asynchronous event-based vision sensors have been developed from that observation on biological retinas.

An asynchronous event-based vision sensor delivers compressed digital data in the form of events. A presentation of such sensors can be found in "Activity-Driven, Event-Based Vision Sensors", T. Delbrück, et al., Proceedings of 2010 IEEE International Symposium on Circuits and Systems (ISCAS), pp. 2426-2429. Event-based vision sensors have the advantage of removing redundancy, reducing latency and increasing the dynamic range with respect to conventional cameras.

The output of such a vision sensor can consist, for each pixel address, in a sequence of asynchronous events that represent changes in the luminance of the scene at the time they occur. Each pixel of the sensor is independent and detects changes in intensity greater than a threshold since the emission of the last event (for example a contrast of 15% on the logarithm for the luminance). When the change in intensity exceeds the threshold, an event is generated by the pixel. In some sensors, the event has a polarity (e.g. ON or OFF) according to whether the intensity increases or decreases. Some asynchronous sensors associate the detected events with measurements of light intensity.

Since the sensor is not sampled on a clock like a conventional camera, it can take the sequencing of events into account with very great time precision (for example of about 1 µs). If such a sensor is used to reconstruct a sequence of images, an image frame rate of several kilohertz can be achieved, compared to a few tens of hertz for conventional cameras.

Event-based sensors have promising perspectives, among others in the field of machine vision and in the field of vision restoration.

The data rate at the output of an event-based sensor depends on the quantity of changes in the scene. This is a desirable feature since, on average, it leads to a large reduction of the amount of data to be sent downstream. However, having a low average data rate is good but not always sufficient. The downstream hardware (communication channels, processing elements) are usually sized with respect to the worst-case scenario. If nothing specific is done, the worst-case scenario can correspond to a very high data rate.

Event-based sensors normally have their throughput limited by their interface. It means that as long as an event is not output, it remains in the pixel. If a new event comes, it will be ignored. While this behavior caps the data rate, it does so at the expense of timing accuracy and correctness of the output. New photons hitting the sensor will be ignored and important events will be lost on the way.

Even if the communication interface does not cause a limitation on throughput, problems can still occur downstream. Overflow may occur at the input of the processor that receives and processes the asynchronously generated events. Software developers who design applications interfaced with the event-based sensor must then bother providing some input processing to try to handle overflow situations, or events are lost in some unpredictable manner.

Some event-based sensors limit the rate by clustering the events in a binary frame. When grouping the events in a binary frame, the data rate becomes fixed. While this has the effect of capping the data rate, it removes the advantage of having a lower average rate. A low average rate is a desirable feature in terms of power consumption of the sensor and of the processing units that receive its output signal.

It is desirable to propose effective methods to handle the output of an event-based sensor.

SUMMARY

The above need is addressed by capping the data rate at a given level without sacrificing on the average rate. The maximum data rate is determined by the person configuring the system as a function of the computational resources available.

Accordingly, a method for outputting a signal from an event-based sensor is disclosed. The event-based sensor has a sensing part that produces events asynchronously and the signal includes information relating to at least some of the produced events. The method comprises:

estimating a rate of production of events by the sensing part;

while the estimated rate is less than a threshold, transmitting the signal having a variable rate; and when the estimated rate is above the threshold, transmitting the signal including information relating to only some of the produced events, such that a rate of events for which information is included in the signal remains within the threshold.

Implementation of the method can have a reasonably low computational complexity, so that it can be performed on the same chip as the sensing part of the event-based sensor. In order to fit on-chip, the method should not buffer data for more than about 1 ms. It should also not do complex operations for every event, such as divisions. The proposed method does not require the use of a frame buffer, which is advantageous given that frame buffers can be fairly large and impact manufacturing yield negatively when laid out on a sensor chip.

As an example, if the chip is connected to an embedded processor, the data rate will generally be set lower than if connected to a farm of servers.

The method does not need an adaptation of the spatial subsampling or temporal resolution of the sensor to the scene conditions.

Instead, configuration parameters can be set depending on the application or depending on the capabilities of the processing units receiving the signal or of the communication channels. In an embodiment, the method can further comprise receiving a value of the threshold, and/or a value of a period for estimating the rate of production of events, as configuration parameters. Such values are given to fit the needs of the channels or processors that receive the signal.

For implementing the method, at least one filter may be applied to the events produced by the event-based sensor in response to the estimated rate exceeding the threshold, so as to discard selected events in the signal to be outputted. Such filters may comprise a temporal filter in which the selected events occur in accordance with a temporal pattern, and/or, in case the event-based sensor has a plurality of spatially distributed sensing elements each having a respective address and producing a respective sequence of events, a spatial filter in which the selected events are produced by sensing elements at addresses corresponding to a spatial pattern. In particular, if the sensing elements of the sensing part are arranged in a two-dimensional matrix, then at least one filter may include a first spatial filter in which the selected events are events produced by sensing elements at addresses corresponding to rows of the matrix and a second spatial filter in which the selected events are events produced by sensing elements at addresses corresponding to columns of the matrix.

Another aspect of an embodiment relates to an event-based sensor that makes use of the above-mentioned method. The event-based sensor comprises a sensing part for producing events asynchronously, an output port, and a controller for providing a signal to the output port, including information relating to at least some of the events produced by the sensing part. The controller is configured to:

estimate a rate of production of events by the sensing part;
while the estimated rate is less than a threshold, provide the signal having a variable rate to the output port; and
when the estimated rate is above the threshold, provide the signal including information relating to only some of the produced events to the output port, such that a rate of events for which information is included in the signal remains within the threshold.

Other features and advantages of the method and event-based sensor disclosed herein will become apparent from the following description of non-limiting embodiments, with reference to the appended drawings.

DETAILED DESCRIPTION

Figure 1:
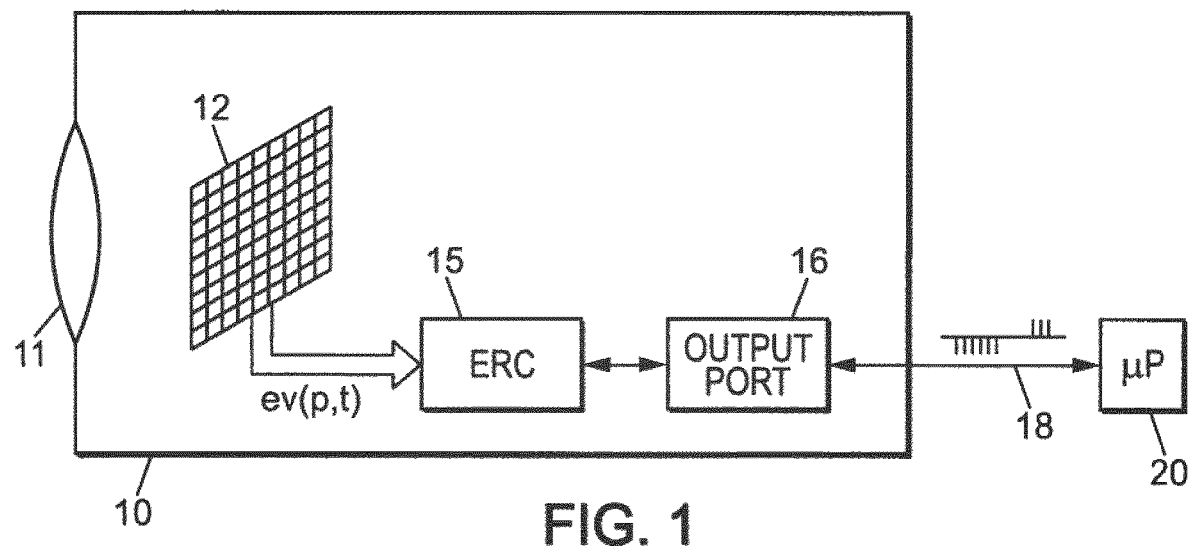
FIG. 1 is a block diagram of a system using an event-based sensor according to an embodiment.

The system shown in FIG. 1 comprises an event-based asynchronous vision sensor 10 placed in front of a scene and receiving light from the scene through acquisition optics 11 comprising one or more lenses. The sensor 10 includes a sensing part 12 placed in the image plane of the acquisition optics 11. The sensing part 12 may comprise an array of photosensitive elements organized as a matrix of pixels. Each pixel corresponding to a photosensitive element p produces successive events ev(p, t) at times t as a function of variations of light in the scene.

A processor 20 processes the asynchronous information originating from the sensor 10, including events ev(p, t) received asynchronously from the photosensitive elements p of the sensing part 12. The processor 20 operates on digital signals using any suitable programming technique, or hardware arrangement. The type of processing executed by the processor 20 is application-dependent and is not a feature of the present disclosure.

The sensing part 12 of the sensor 10 generates a sequence of events for each pixel p of the matrix, using the variations of light detected by the pixel in the scene that appears in the field of vision of the sensor. Those event sequences from the pixels are aggregated into a signal by a controller 15 associated with the output interface of the sensor 10. The signal uses an address-event representation (AER) and is supplied to the processor 20 through an output port 16 of the sensor 10 and a communication link 18. Each event in the output signal includes at least one spike whose temporal position indicates a change in luminance seen by a pixel, associated with an address of that pixel in the matrix. One or more luminance attribute(s), such polarity information and/or a luminance value, can also be associated with the event. The communication link 18 may use any suitable communication medium and any suitable communication protocol. As an illustration, it may be based on a universal serial bus (USB) port 16.

By way of example, the sensing part 12 that carries out the acquisition of events can be embodied as a dynamic vision sensor (DVS) of the type described in "A 128×128 120 dB 15 µs Latency Asynchronous Temporal Contrast Vision Sensor", P. Lichtsteiner, et al., IEEE Journal of Solid-State Circuits, Vol. 43, No. 2, February 2008, pp. 566-576, or in patent application US 2008/0135731 A1.

Another example of an asynchronous sensor that can take advantage of an embodiment is the asynchronous time-based image sensor (ATIS) of which a description is given in the article "A QVGA 143 dB Dynamic Range Frame-Free PWM Image Sensor With Lossless Pixel-Level Video Compression and Time-Domain CDS", C. Posch, et al., IEEE Journal of Solid-State Circuits, Vol. 46, No. 1, January 2011, pp. 259-275.

The controller 15 is referred to as an event rate controller (ERC) in the following. A possible embodiment of the ERC is illustrated in FIG. 2.

In that embodiment, the ERC 15 processes data in series as provided by the readout circuitry of the sensing part 12. The ERC 15 has a rate measurement component 30 which receives the events generated by the array 12 of sensing elements. The event rate $R_E$ is estimated by the component 30, for example by simply counting the events detected by the array 12 in a given time period T. The event count $C_E$ (=$R_E \times T$) is provided to a comparator 31 that compares it to a threshold S.

While $C_E \leq S$, namely while the event rate $R_E$ is within a threshold S/T, the events produced by the array 12 of sensing elements are directly fed to the output port 16 for transmission to the processor 20. This is illustrated diagrammatically in FIG. 2 with switches 32. In this case, the signal transmitted through the output port 16 retains the variable rate of the events produced by the array 12.

Figure 2:
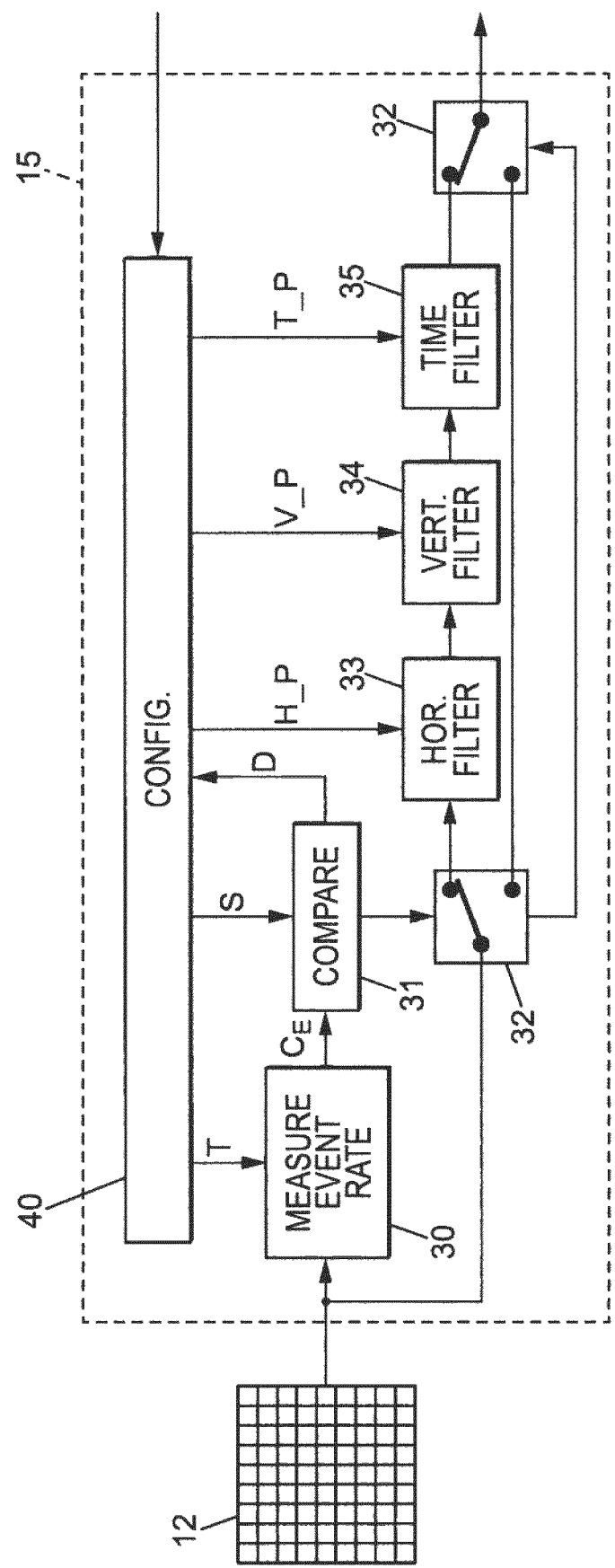
FIG. 2 is a block diagram of an example of event rate controller usable in a system as shown in FIG. 1.

When the comparator 31 reveals that $C_E > S$, namely that the event rate $R_E$ exceeds the threshold S/T, the stream of events from the array 12 is subjected to a filter bank of the ERC 15 which, in the illustrated embodiment, includes two spatial filters 33, 34 and a temporal filter 35 (the illustrative switches 32 are then in the positions shown in FIG. 2).

The filters 33-35 apply sub-sampling to the events from the array 12 such that the rate of events in the signal transmitted through the output port 16 remains within the threshold S/T. In other words, each filter 33-35 discards some events in the signal, the events discarded by one of the filters being selected according to a respective pattern H_P, V_P, T_P indicated by a configuration module 40 of the ERC 15.

In the embodiment shown in FIG. 2, the filter bank includes two spatial filters 33-34 followed by a temporal filter 35.

In the spatial filters 33-34, the patterns H_P, V_P for discarding events correspond to regions of the array of sensing elements, i.e. to specific addresses of sensing elements in the matrix forming the array 12. There is a horizontal filter 33 in which the events to be discarded originate from sensing elements at addresses corresponding to rows of the matrix, followed by a vertical filter 34 in which the selected events originate from sensing elements at addresses corresponding to columns of the matrix. The rows of the matrix where the horizontal filter 33 discards events may be regularly spaced, with a density $D_H$. The columns of the matrix where the vertical filter 34 discards events may be regularly spaced, with a density $D_V$.

In the temporal filter 35, the pattern T_P for discarding events corresponds to certain time intervals in which events are discarded, with a drop duty ratio $D_T$.

When the filters 33-35 are cascaded, as shown in FIG. 2, the overall drop rate D' applied by the filter bank may be calculated as $D'=[1-(1-D_H)\times(1-D_V)\times(1-D_T)]$. The respective drop rates $D_H$, $D_V$, $D_T$ of the filters 33, 34, 35 are set by the configuration module 40 as a function of a target drop rate D given by the comparator 31, such that D'=D or D'≈D.

The order in which the three filters process the stream of events may be different from the one illustrated in FIG. 2. In addition, there can be less than three filters, or more than three filters, to drop events in a controlled manner when the estimated event rate $R_E$ exceeds the threshold S/T. In addition, the space/time filtering of the events can have forms different from those presented above. For example, a spatial filter may apply a drop pattern in which the selected events are located both in specified columns and in specified rows In an embodiment of the ERC, the comparator 31 provides, at each period T, a target drop rate D that depends on how the estimated event rate $R_E$ compares with the threshold S/T. By way of example, the target drop rate D may be quantized using a number N of bits representing an integer A=0, 1, 2, . . . , $2N-1$, such that $D=A/2^N$, where $A=\lfloor 2^N \cdot (1-S/C_E) \rfloor$. When $C_E \leq S$, A is zero, i.e. no events are discarded by the filters 33-35. Otherwise, the comparator 31 puts the value of the event count $C_E$ in one of $2^{N-1}$ bins determined based on the threshold S. Which bin receives the event count $C_E$ determines the N bits quantizing the integer A that gives the drop rate D. Again, no complex computation is needed for such processing.

The configuration module 40 receives the drop rate D from the comparator 31 and determines patterns H_P, V_P, T_P to be used by the filters 33-35 when $R_E > S/T$, by setting their respective event drop rates $D_H$, $D_V$, $D_T$ as mentioned above. The patterns H_P, V_P, T_P may be determined by the configuration module 40 using a predefined lookup table accessed using addresses formed by the bits representing the target drop rate D.

How the target drop rate D is split into three event drop rates $D_H$, $D_V$, $D_T$ may depend on a configuration parameter provided by the designer of the configuration module, or received from the processor 20 through the communication link 18. Depending on the application run by the processor 20, filtering strategies with more or less importance on the temporal, vertical or horizontal drop patterns may be more suitable. This can be specified by setting the configuration parameter. There can be a default strategy, for example to split the target drop rate D equally between the three rates $D_H$, $D_V$, $D_T$, when no configuration parameter is provided.

The reference period T in which the events are counted is another configuration parameter which can be set by the user interface provided on the communication link 18. The processor 20 may select the reference period T according to its own dynamic behavior given that, when a longer period T is selected there can remain a risk that bursts of events cause temporary overflow at the output of the sensor 10 or at the input of the processor 20. Typically, when the above-mentioned examples of event-based sensors 10 are used, the reference period T may be in a range of 10 to 500 microseconds.

A main configuration parameter is the value of the threshold S to which the event count $C_E$ is compared. The ratio S/T is directly linked to the throughput of the signal sent by the sensor 10 to the processor 20. The value of S can also be set by the user interface provided on the communication link 18.

The ERC 15 illustrated diagrammatically in FIG. 2 does not include a buffer for temporarily storing events prior to filtering. In practice, there can be an event buffer, whose dimension is larger when the reference period T increases, such that the target drop rate D determined for a period T is applied to the set of events generated by the array 12 during the same period T. However, presence of such a buffer is not a requirement in all applications. It is also possible to buffer events over a time period shorter than the reference period T.

It is noted that the process run by the ERC 15 is fairly simple to achieve the function of removing excess events in a controlled manner. This removes the need to have a filter using CPU capacity to sort events.

It will be appreciated that the embodiments described above are illustrative and that various modifications can be made without departing from the scope as defined in the appended claims.

For example, some of the events produced by the array 12 may be discarded prior to transmission to the processor 20 due to other functions carried out at the level of the sensor 10, for example functions that remove events carrying little information (e.g. noise, flickering effects, trail filter, etc.). The ERC processing described above is usable at the output interface to make sure that the output signal of the event-based sensor will meet the desired data rate.

In other embodiments, the event drop rate may be set to vary across the field of view of the sensing part 12. For example, spatial filters can be used to provide a grid of areas for preferentially dropping events. Which filters are applied by the ERC 15, and with which parameters, may be configured as a function of the application run by the processor 20.

An embodiment may be useful in a variety of devices including, without limitation, autonomous vehicles, prosthetic devices, autonomous and robotic apparatus such as manufacturing robots, military or medical robotic devices.

It may further be applicable in a wide variety of stationary and portable devices, such as, for example, smart phones, portable communication devices, notebook, netbook and tablet computers, surveillance systems, and practically any other computerized device configured to process vision data.

Implementations may be used in many applications including computer human interaction (e.g., recognition of gestures, voice, posture, face, and/or other applications), controlling processes (e.g., an industrial robot, autonomous and other vehicles), following movements of a set of interest points or objects (e.g., vehicles or humans) in the image sequence and with respect to the image plane, augmented reality applications, virtual reality applications, access control (e.g., opening a door based on a gesture, opening an access way based on detection of an authorized person), detecting events (e.g., for visual surveillance or people or animal), counting, tracking, etc. Myriads of other applications exist that will be recognized by those of ordinary skilled in the art given the present disclosure.

The invention claimed is:

1. A method for outputting a signal from an event-based sensor, wherein the event-based sensor has a sensing part that produces events asynchronously and the signal includes information relating to at least some of the produced events, the method comprising:
estimating a rate of production of events by the sensing part;
while the estimated rate is less than an event rate threshold, transmitting the signal having a variable rate; and
when the estimated rate is above the event rate threshold, transmitting the signal including information relating to only some of the produced events, such that a rate of events for which information is included in the signal remains within the event rate threshold.

2. The method of claim 1, further comprising receiving a value of the event rate threshold as a configuration parameter.

3. The method of claim 1, further comprising receiving a value of a period for estimating the rate of production of events as a configuration parameter.

4. The method of claim 1, wherein at least one filter is applied to the produced events in response to the estimated rate exceeding the event rate threshold, so as to discard selected events in the signal to be outputted.

5. The method of claim 4, wherein the at least one filter comprises a temporal filter in which the selected events occur in accordance with a temporal pattern.

6. The method of claim 4, wherein the sensing part comprises a plurality of spatially distributed sensing elements each having a respective address and producing a respective sequence of events, and wherein the at least one filter comprises a spatial filter in which the selected events are events produced by sensing elements at addresses corresponding to a spatial pattern.

7. The method of claim 6, wherein the sensing elements of the sensing part are arranged in a two-dimensional matrix, and wherein the at least one filter includes a first spatial filter in which the selected events are events produced by sensing elements at addresses corresponding to rows of the matrix and a second spatial filter in which the selected events are events produced by sensing elements at addresses corresponding to columns of the matrix.

8. An event-based sensor, comprising:
a sensing part for producing events asynchronously;
an output port; and
a controller for providing a signal to the output port, including information relating to at least some of the events produced by the sensing part,
wherein the controller is configured to:
estimate a rate of production of events by the sensing part;
while the estimated rate is less than the event rate threshold, provide the signal having a variable rate to the output port; and
when the estimated rate is above the event rate threshold, provide the signal including information relating to only some of the produced events to the output port, such that a rate of events for which information is included in the signal remains within the event rate threshold.

9. The device of claim 8, wherein the controller is configured to receive a value of the event rate threshold as a configuration parameter.

10. The device of claim 8, wherein the controller is configured to receive a value of a period for estimating the rate of production of events as a configuration parameter.

11. The device of claim 8, wherein the controller comprises at least one filter which is applied to the produced events in response to the estimated rate exceeding the event rate threshold, so as to discard selected events in the signal provided to the output port.

12. The device of claim 11, wherein the at least one filter comprises a temporal filter in which the selected events occur in accordance with a temporal pattern.

13. The device of claim 11, wherein the sensing part comprises a plurality of spatially distributed sensing elements each having a respective address and producing a respective sequence of events, and wherein the at least one filter comprises a spatial filter in which the selected events are events produced by sensing elements at addresses corresponding to a spatial pattern.

14. The device of claim 13, wherein the sensing elements of the sensing part are arranged in a two-dimensional matrix, and wherein the at least one filter includes a first spatial filter in which the selected events are events produced by sensing elements at addresses corresponding to rows of the matrix and a second spatial filter in which the selected events are events produced by sensing elements at addresses corresponding to columns of the matrix.

* * * * *